US012759808B2

(12) United States Patent
Gross

(10) Patent No.: US 12,759,808 B2
(45) Date of Patent: Oct. 13, 2026

(54) GRIPPER FOR ORDER-PICKING APPARATUS

(71) Applicant: Becton Dickinson Rowa Germany GmbH, Kelberg (DE)

(72) Inventor: Dietmar Gross, Kelberg (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 802 days.

(21) Appl. No.: 18/025,754

(22) PCT Filed: Aug. 24, 2021

(86) PCT No.: PCT/EP2021/073391
§ 371 (c)(1),
(2) Date: Mar. 10, 2023

(87) PCT Pub. No.: WO2022/063507
PCT Pub. Date: Mar. 31, 2022

(65) Prior Publication Data

US 2023/0348206 A1 Nov. 2, 2023

(30) Foreign Application Priority Data

Sep. 22, 2020 (EP) .................................... 20197478

(51) Int. Cl.
*B65G 47/90* (2006.01)
*B25J 15/00* (2006.01)
(Continued)

(52) U.S. Cl.
CPC .......... *B65G 47/90* (2013.01); *B25J 15/0028* (2013.01); *B25J 15/0253* (2013.01); *B65G 61/00* (2013.01)

(58) Field of Classification Search
CPC .... B65G 47/90; B65G 47/902; B65G 47/905; B65G 47/907; B65G 61/00;
(Continued)

(56) References Cited

U.S. PATENT DOCUMENTS 3,527,492 A 9/1970 Hollis
2010/0263500 A1 10/2010 Bannasch et al.
2020/0109014 A1 4/2020 Hellenbrand

FOREIGN PATENT DOCUMENTS

CN 205906698 U 1/2017
DE 102006009559 B3 5/2007
(Continued)

OTHER PUBLICATIONS

Extended European Search Report for Application No. 20197478.9, dated Mar. 12, 2021, 11 pages including machine translation.
(Continued)

*Primary Examiner* — Gilbert Y Lee
(74) *Attorney, Agent, or Firm* — Myers Bigel, P.A.

(57) ABSTRACT

A gripper by means of which small articles, in particular pharmaceutical packs and food-supplement packs, are introduced into, and removed from, an order-picking apparatus. The gripper comprises a set-down table which extends in first and second horizontal directions and two gripping jaws, which are arranged above the set-down table and are fastened on a gripping-jaw-guide arrangement, wherein at least one of the gripping jaws has an at least partially elastic longitudinal guide with a free end portion and a fastening end portion and also has a gripping-jaw tendon element, and wherein a first end portion of the gripping-jaw tendon element is fastened at the free end portion and a second end portion of the gripping-jaw tendon element is coupled to a
(Continued)

pulling means, arranged at the fastening end portion, such that the gripping-jaw tendon element can be moved in the first direction.

20 Claims, 5 Drawing Sheets

(51) Int. Cl.
*B25J 15/02* (2006.01)
*B65G 61/00* (2006.01)

(58) Field of Classification Search
CPC B25J 15/0028; B25J 15/0253; B25J 15/0052; B25J 15/026; B25J 15/0273; B25J 15/0293
See application file for complete search history.

(56) References Cited

FOREIGN PATENT DOCUMENTS

| | | | |
|---|---|---|---|
| DE | 102011010557 | A1 | 8/2012 |
| DE | 102014117291 | A1 | 6/2016 |
| EP | 3431421 | A1 | 1/2019 |
| JP | H1179321 | A | 3/1999 |
| JP | 2006168786 | A | 6/2006 |
| JP | 2017095199 | A | 6/2017 |

OTHER PUBLICATIONS

Japanese Office Action for Application No. 2023-515558, dated Apr. 22, 2025, 13 pages including translation.
International Search Report and Written Opinion for Application No. PCT/EP2021/073391, dated Nov. 30, 2021, 18 pages including English translation.

Fig. 4a
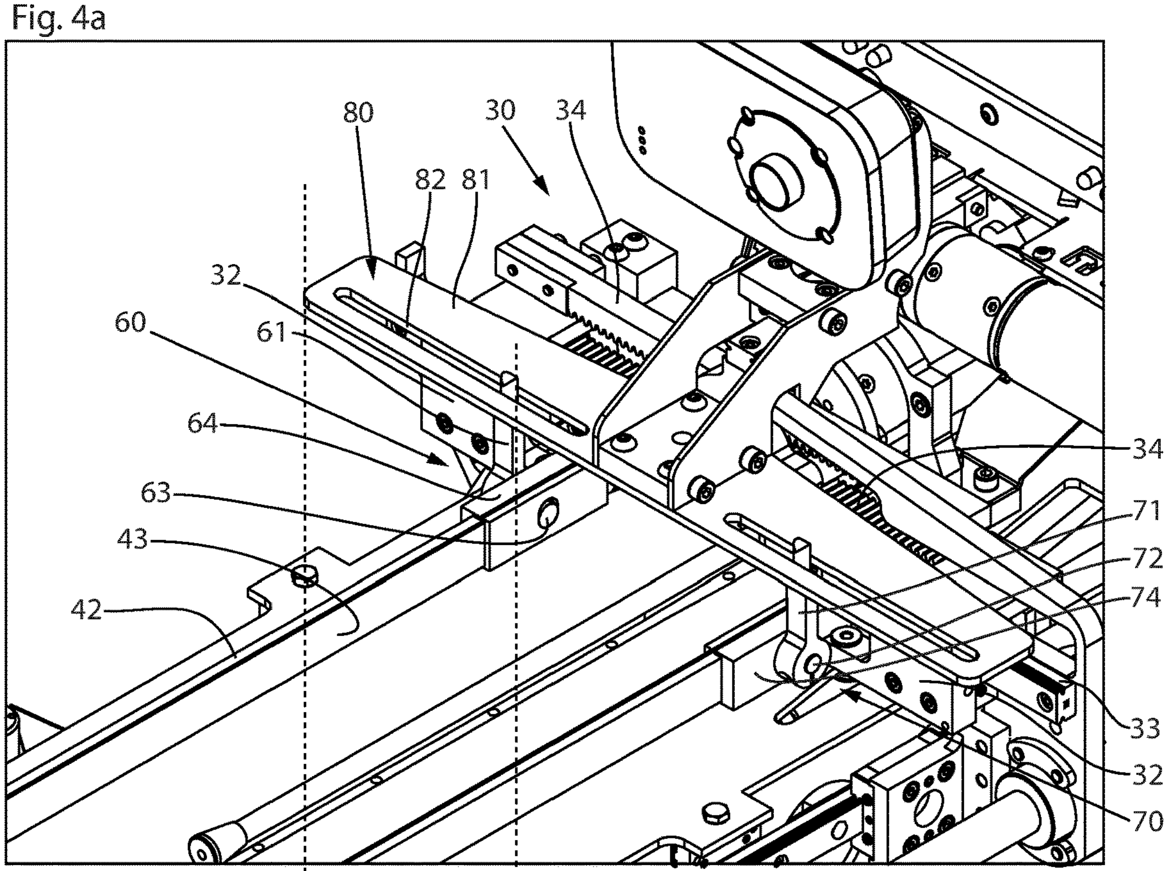
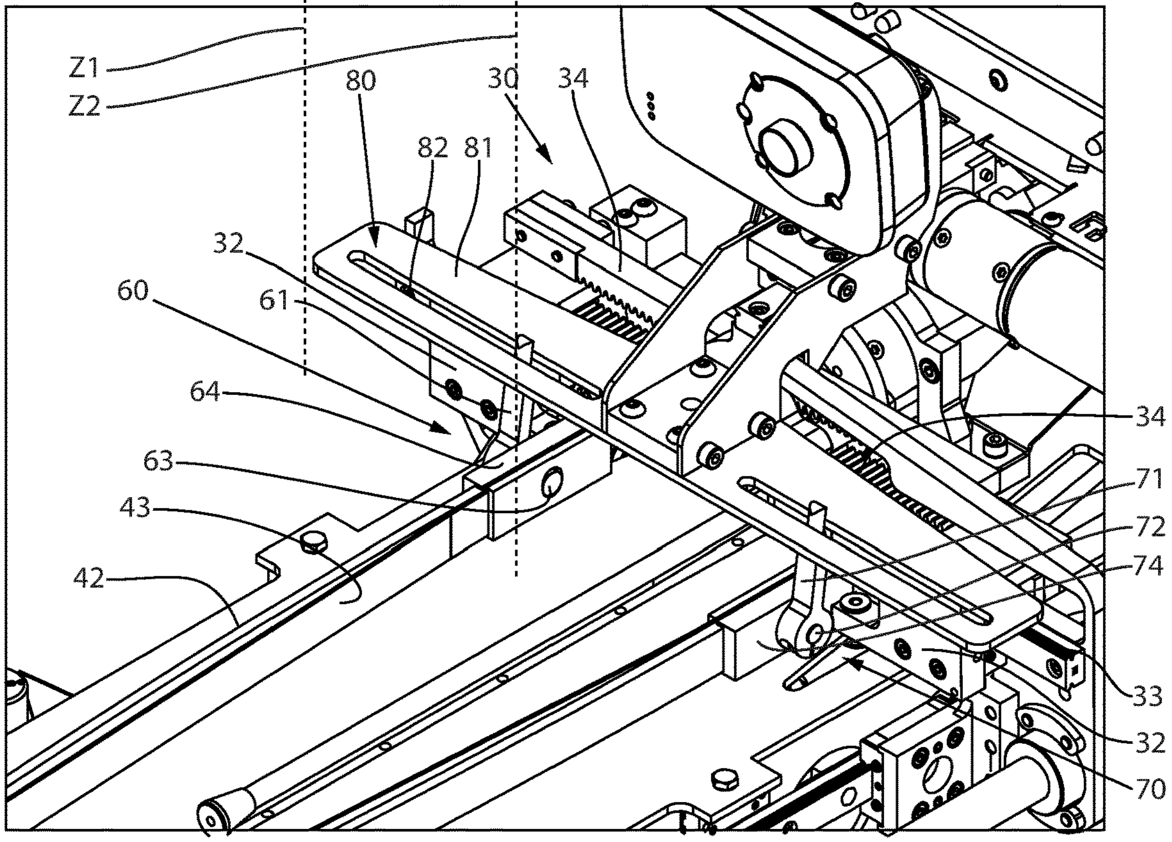
Fig. 4b

GRIPPER FOR ORDER-PICKING APPARATUS

CROSS-REFERENCE TO RELATED APPLICATIONS

The present application is a national stage application of International Patent Application No. PCT/EP2021/073391, entitled "GRIPPER FOR ORDER PICKING APPARATUS," filed Aug. 24, 2021, which claims the benefit of and priority to European Patent Application No. 20197478.9, entitled "GRIPPER FOR ORDER PICKING APPARATUS," filed Sep. 22, 2020, both of which are incorporated herein by reference in their entirety.

TECHNICAL FIELD

The present invention relates to a gripper used in storing and retrieving small piece goods, in particular pharmaceutical packages and food supplement packages, into/from a picking apparatus.

BACKGROUND

In modern picking apparatuses, such as those often used in pharmacies, a large number of different and differently dimensioned pharmaceutical packages or food supplement packages are stored on long horizontal shelves in a chaotic and space-optimized manner. Together with the shelf walls, these shelves form a plurality of shelf compartments, and a large number of small piece goods are stored in each shelf compartment or on each shelf. With space-optimized chaotic storage, small piece goods such as pharmaceutical packages and food supplement packages are stored on shelves in such a way that the greatest possible number of small piece goods can be stored per unit area of a shelf, i.e., in such a way that as little free space as possible remains on a shelf.

In modern picking apparatuses, a plurality of small piece goods are usually stored one behind the other (in relation to the storage and retrieval direction), and care is regularly taken to ensure that the small piece goods are stored in such a way that, by virtue of their dimensions, they can be gripped by the grippers used in the picking apparatus in such a way that at least two small piece goods can be moved at once from a shelf onto a delivery table of the gripper.

A gripper type known from the prior art comprises two elongated gripping jaws extending in the storage and retrieval direction (X direction), of which at least one is movable orthogonally to the storage and retrieval direction (in the Y direction). The gripping jaws are usually fastened to a gripping jaw guide arrangement, wherein the gripping jaw guide arrangement can be moved in the storage and retrieval direction, and comprises the components for moving at least one gripping jaw in the Y direction.

At least one of the gripping jaws is usually pivotably mounted by its fastening end on the gripping jaw guide arrangement, such that the free end portion of the gripping jaw can be moved toward the other gripping jaw. With a correspondingly designed gripper, the small piece goods can be clamped by the free end portion of the at least one pivotable gripping jaw. Depending on the arrangement of the small piece good, it can also be gripped from behind, so that the small piece good(s) to be retrieved is/are not solely clamped—as would be the case if at least one gripping jaw is movable only in the Y direction.

In known grippers, the pivoting movement is initiated relative to the free end portion of the gripping jaw (i.e., at the fastening end) so that only a certain clamping force can be exerted with the at least one pivotable gripping jaw. It is further disadvantageous in known grippers that the pivoted gripping jaw bends—because of the difference between the location at which the pivoting is initiated and the "engagement point" with the piece good item(s) to be retrieved.

SUMMARY

It is an object of the present invention to provide a gripper for a picking apparatus with which an increased clamping force can be provided on a piece good to be retrieved with at least one pivotable gripping jaw.

The object of the present invention is achieved by a gripper for storing and retrieving small piece goods into or from a picking apparatus according to claim 1. The gripper according to the invention comprises a delivery table extending in a first horizontal direction (X direction) and in a second horizontal direction (Y direction) which is orthogonal to the first horizontal direction, with at least one storage and retrieval end face, and a gripping jaw guide arrangement with two elongate gripping jaws extending over the delivery table, wherein the gripping jaw guide arrangement can be moved in the X direction, and at least one of the gripping jaws can be moved in the Y direction.

According to the invention, it is provided that at least one of the gripping jaws has an at least partially elastic longitudinal guide with a free end portion facing away from the gripping jaw guide arrangement, and has an opposite fastening end portion, as well as a gripping jaw cord which extends in a non-tensioned state in parallel along a portion of the elastic longitudinal guide, wherein a first end portion of the gripping jaw cord is fastened to a free end portion of the elastic longitudinal guide, and a second end portion of the gripping jaw cord is coupled to a traction means arranged in the X direction in such a manner that the gripping jaw cord can be moved in the X direction, wherein a movement of the gripping jaw cord in the X direction causes a movement of the free end portion of the elastic longitudinal guide in the Y direction.

Unlike in the case of known grippers, the pivoting movement of the gripping jaw is not initiated on the fastening end portion, but instead at the free end portion via the coupling to the gripping jaw cord. The movement of the gripping jaw cord in the X direction "shortens" or "extends" the gripping jaw cord portion between the end portions of the elastic longitudinal guide. Due to its elasticity, a shortening is converted into a pivoting movement; an extension causes a pivoting back into the original position.

Greater clamping forces can thus be exerted with the gripper according to the invention, since the gripping jaw cord, the movement of which triggers the pivoting or return movement, engages with the free end portion of the elastic longitudinal guide. Usually, a small piece good item to be retrieved is gripped/clamped in the region of the free end portion, such that the force which can be transmitted in this region is decisive. The design also prevents flexion because the contact point of the gripping jaw cord with the free end portion of the elastic longitudinal guide.

The invention can be used with grippers that store and retrieve the small piece goods via only one storage and retrieval end face, and can also be used in systems with delivery tables having two storage and retrieval end faces.

Whether the gripping jaw moves/pivots away from the gripper in the Y direction or towards its longitudinal axis extending in the X direction is dependent on the arrangement of the elastic longitudinal guide and the gripping jaw cord and/or the fastening thereof. Small piece goods are usually stored in such a manner that a retrieval is brought about by moving the free end portions toward one another. In a preferred embodiment of the gripper according to the invention, it is therefore provided that at least one gripping jaw is arranged between an elastic longitudinal guide and an opposite gripping jaw so that a pulling movement exerted on a gripping jaw cord by the traction means assigned to the gripping jaw cord moves the free end portion of a gripping jaw towards the opposite gripping jaw.

In order to reliably retrieve a small piece good or a plurality of small piece goods, it is provided in a preferred embodiment that the gripper has two traction means, and both gripping jaws have an elastic longitudinal guide and a gripping jaw cord, wherein the gripping jaws are arranged between the elastic longitudinal guides, such that a pulling movement exerted by the traction means onto the gripping jaws moves the free end portions of the gripping jaws toward each other.

The precise manner in which the movement of the gripping jaw cord is brought about is not essential for the invention. For example, a gripping jaw cord can be coupled to a traction means which is designed as a linear drive. Alternatively, the gripping jaw cord could be coupled to a cable pull mechanism. However, the aforementioned embodiments are relatively complex in terms of construction. In a structurally simple embodiment, it is provided that a traction means is designed as a lever device with a force arm and with a rotary axle, wherein the rotary axle has an eccentric circular attachment which engages in an opening at the second end portion of a gripping jaw cord.

A movement of the force arm in the X direction is converted into a rotational movement of the rotary axle. By virtue of an eccentric attachment engaging in an opening in the second end portion of a gripping cord, a rotation of the rotary axle causes a displacement of the eccentric attachment in the X direction, which in turn causes a movement in the gripping jaw cord in the X direction and thus a pivoting.

The movement of the force arms in the X direction (and thus the rotation of the rotary axle) can be brought about by each force arm being coupled to a separate drive. In a preferred, structurally very simple embodiment, it is however provided that free ends of the force arms of the traction means engage in an elongated hole of a traction means actuator which is movable in the X direction.

BRIEF DESCRIPTION OF THE DRAWINGS

In the following, a preferred embodiment of the gripper according to the invention will be described with reference to the appended drawings, in which:

FIGS. 4*a* and 4*b* are detailed views of FIGS. 1*a* and 113,

DETAILED DESCRIPTION

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

Figure 1A:
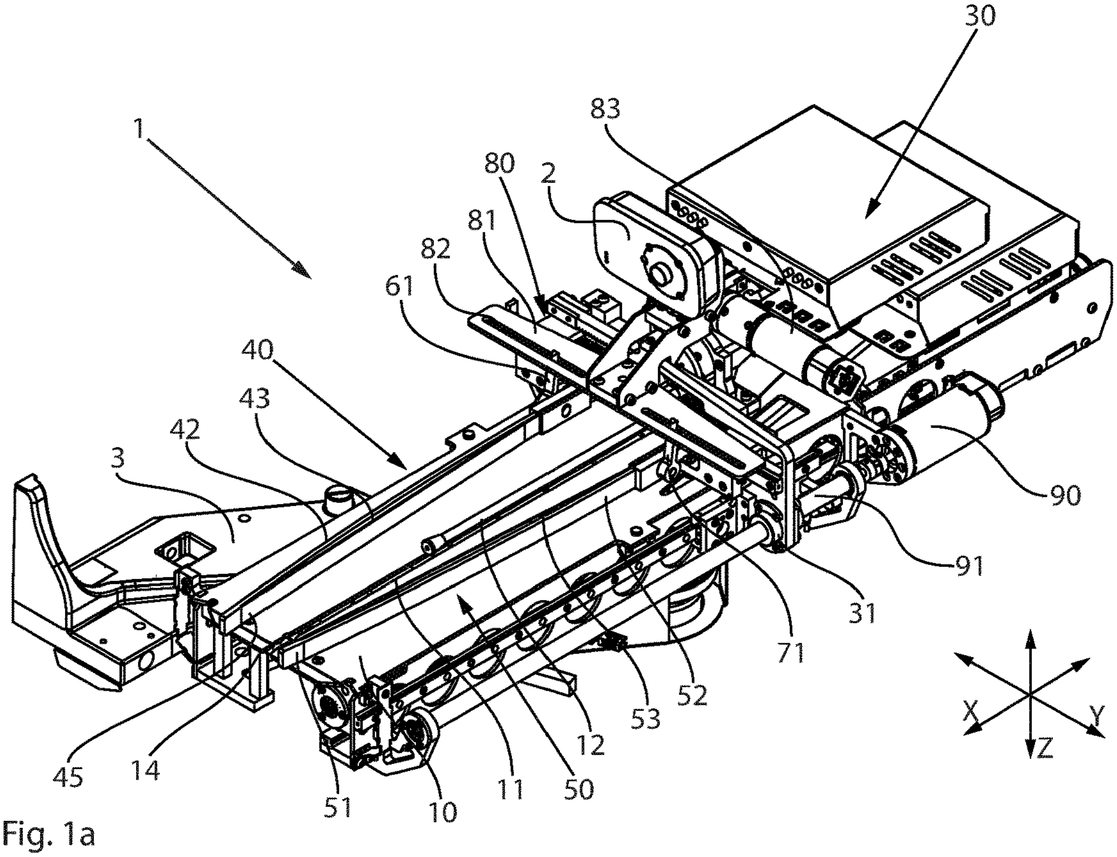
FIGS. 1*a* and 1*b* are oblique views of the preferred embodiment of the gripper, the gripping jaws of the gripper being pivoted in FIG. 1*a;*
Figure 1B:
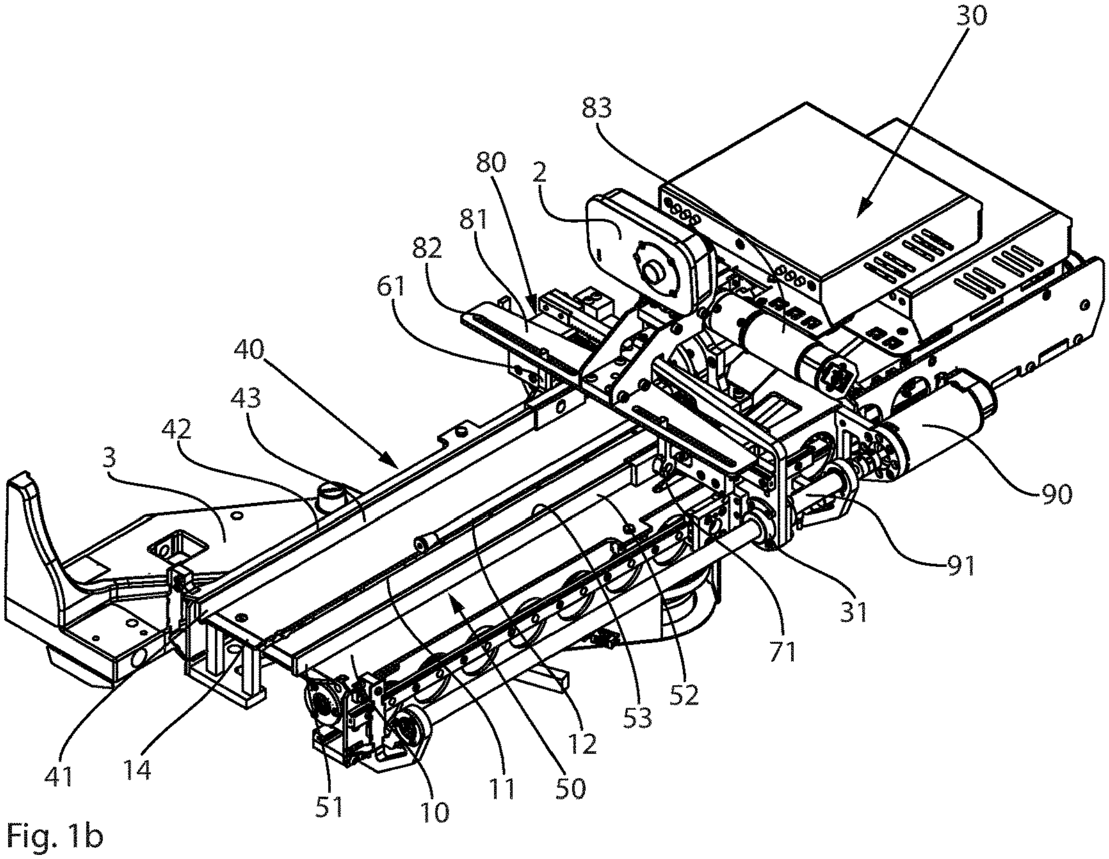

FIGS. 1*a* and 1*b* are oblique views of the preferred embodiment of the gripper 1 according to the invention. The gripper 1 comprises a delivery table 10 extending in a first horizontal direction (storage and retrieval direction; X direction) and a second horizontal direction (Y direction) which is orthogonal to the first horizontal direction, with at least one storage and retrieval end face 14. A gripping jaw arrangement (30) with two elongate gripping jaws 40, 50 extending in the X direction is arranged above the delivery table 10. In the embodiment shown, the two gripping jaws 40, 50 are movable in the Y direction; the movement mechanism is described in more detail with reference to the following figures.

The gripper according to the invention further comprises a traction means actuating device 80 with a traction means guide 81 which has two elongate holes 82 in which free ends of force arms 61, 71 of two traction means engage. As is described in more detail with reference to the following figures, the traction means themselves are movable in the Y direction and bring about a pivoting of the gripping jaws 40, 50. In the embodiment shown, a sensor 2 with which different aspects of a storage and retrieval process can be monitored is arranged on the traction means actuating device 80.

The two gripping jaws 40, 50 comprise an elastic longitudinal guide 42, 52 with a free end portion 41, 51 facing away from the gripping jaw guide arrangement 30, and an opposite fastening end portion 44, 54 via which the elastic longitudinal guides are fastened to traction means, the precise design and mode of operation of which will be described in more detail with reference to the following figures. On their free end portions 41, 51, the two gripping jaws 40, 50 are coupled to a first end portion 45, 55 of a gripping jaw cord 43, 53, which extends parallel to the elastic longitudinal guides 42, 52 in the non-pivoted state of the gripping jaws shown in FIG. 1*b*. In addition, the gripping jaw cords 43, 53 are coupled via a second end portion to a traction means in such a way that the gripping jaws can be moved in the X direction. Such a movement of the gripping jaw cords in the X direction causes a movement of the free end portion of the associated elastic longitudinal guide in the Y direction. The gripping jaw cords of the gripper according to the invention curve the elastic longitudinal guides of the gripping jaws according to the arc/cord principle—that is, a shortening of a gripping jaw cord (corresponding to a movement of the second end portion of a gripping jaw cord away from the free end portion) results in a bending of the elastic longitudinal guide. This movement is simply referred to here as "pivoting." Since, in the embodiment shown, the gripping jaw cords are arranged "on the inside" in relation to the elastic longitudinal guides, the movement of the gripping jaw cords in the X direction towards the gripping jaw guide arrangement causes a pivoting of the free ends of the elastic longitudinal guides toward one another.

In contrast to known grippers, the "pivoting" of the free ends of the gripping jaws is therefore not brought about by initiating a pivoting movement of the gripping jaws by means of a pivot joint arranged in the gripping jaw guide arrangement, but rather the gripping jaw cord engages in the free end portion of the elastic longitudinal guide which is opposite the gripping jaw guide arrangement, and produces a movement of the free end portion of the gripping jaws by the movement in the X direction. In alternative embodiments of the gripper, and according to the manner in which small piece goods are stored in the picking apparatus, it would also be conceivable purely in principle for the gripping jaws to be moved or pivoted "each to the outside" for the purpose of retrieving small piece goods.

The gripper shown in FIGS. 1*a* and 1*b* comprises a recess 11 extending in the X direction of the delivery table 10, in which a slide device 12 is guided, by means of which small piece goods can be moved from the delivery table onto a shelf base of the picking apparatus, specifically via the storage and retrieval end face 14 of the delivery table 10. The drive of the slide device is arranged below the delivery table and is not illustrated in the figures.

The gripping jaw guide arrangement 30 can be moved in the X direction, for which purpose it is coupled to a drive unit. The precise design of the drive unit is not essential to the invention; numerous specific embodiments are known to a person skilled in the art. In the embodiment shown, the gripper comprises a drive 90 arranged on the side of the gripping jaw guide arrangement 30, which can drive a spindle 91 extending parallel to the delivery table, which in turn interacts with a coupling means 31 of the gripping jaw guide arrangement 30, such that the gripping jaw guide arrangement can be moved in the X direction by a rotational movement of the spindle 91.

In the embodiment shown, the traction means actuating device 80 is coupled to the gripping jaw guide arrangement 30, such that the aforementioned rotational movement also moves the traction means actuating device 80 in the X direction. The traction means actuating device 80 comprises a drive 83 by means of which the traction means guide 81 can be moved relative to the gripping jaw guide arrangement 30 in the X direction. How exactly the movement of the traction means guide 81 causes movement of the gripping jaw cords will be described in more detail with reference to subsequent figures.

Figure 2B:
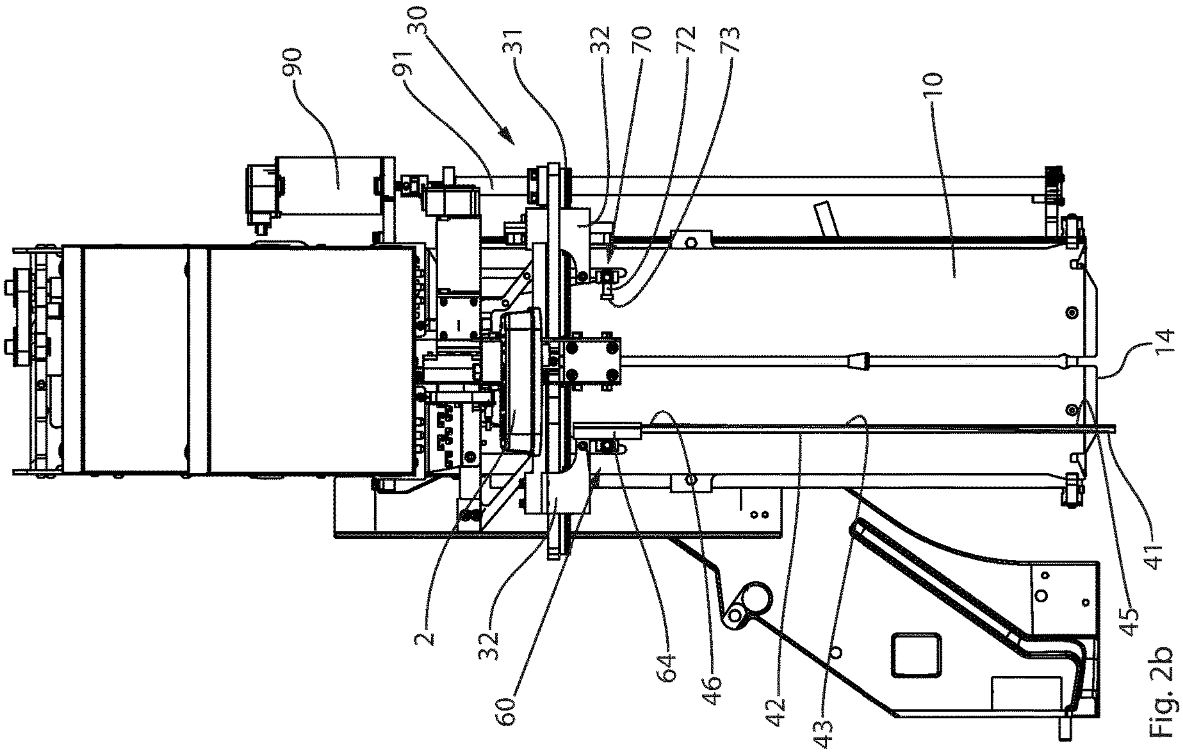
FIGS. 2*a* and 2*b* are two plan views of the preferred embodiment, wherein in FIG. 2*a* the gripping jaws are again pivoted, and in FIG. 2*b* a traction means actuating device is partially omitted.
Figure 2A:
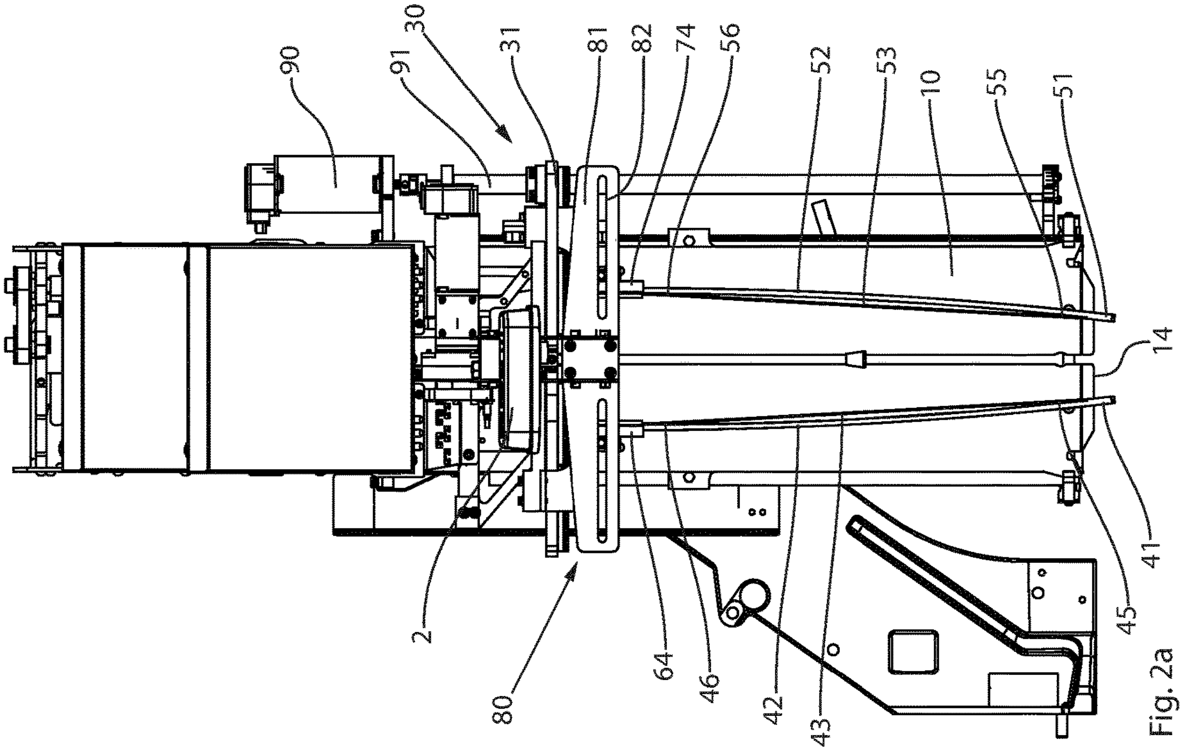

FIGS. 2*a* and 2*b* show plan views of the preferred embodiment of the gripper according to the invention; in FIG. 2*a*, the two gripping jaws 40, 50 are moved toward each other, i.e., pivoted, at the free end portions 41, 51 of the elastic longitudinal guides. In FIG. 2*b*, the traction means actuating device and the right gripping jaw are omitted so that it can already be recognized how a gripping jaw is arranged on a traction means.

In FIG. 2*a*, it can be seen that the pivoting movement causes the gripping jaw cords and elastic longitudinal guides extending in parallel in the non-pivoted state (see FIG. 2*b*) to "separate" from one another, this separation being dependent on the degree of pivoting of the gripping jaws. It can be seen in particular in FIG. 2*a* that the gripping jaw cords 43, 53 are each coupled at their first end portions 45, 55 with the free end portion of an elastic longitudinal guide. At a second end portion 46, 56, the gripping jaw cords run into a guide housing 64, 74 of a traction means, in which guide housing the second end portions are coupled to eccentric attachments on the rotary axles of the traction means. Furthermore, the elastic longitudinal guides are fastened in the guide housings.

In FIG. 2*b*, the guide housing of the traction means is also omitted in the right part of the figure (in addition to the gripping jaw itself); and it can be seen that the traction means comprises a rotary axle 72 and a circular attachment 73, wherein the exact configuration thereof is described in more detail with reference to the following figures.

Figure 3A:
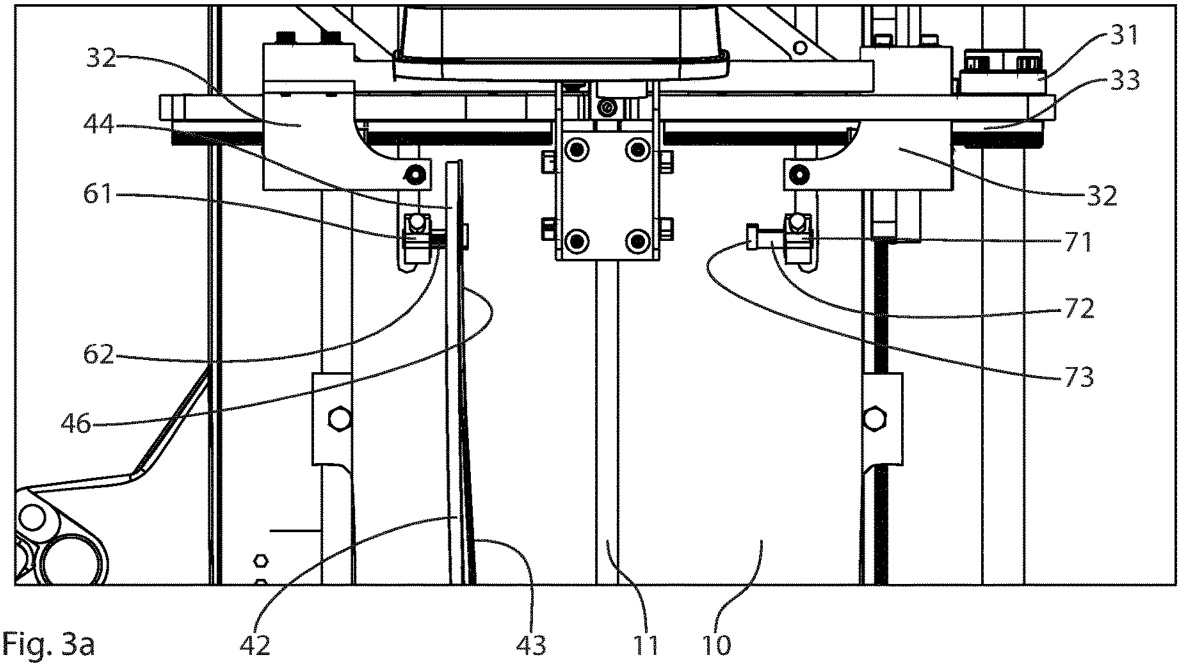
FIGS. 3*a* and 3*b* are detailed views of the fastening region of the gripping jaws.
Figure 3B:
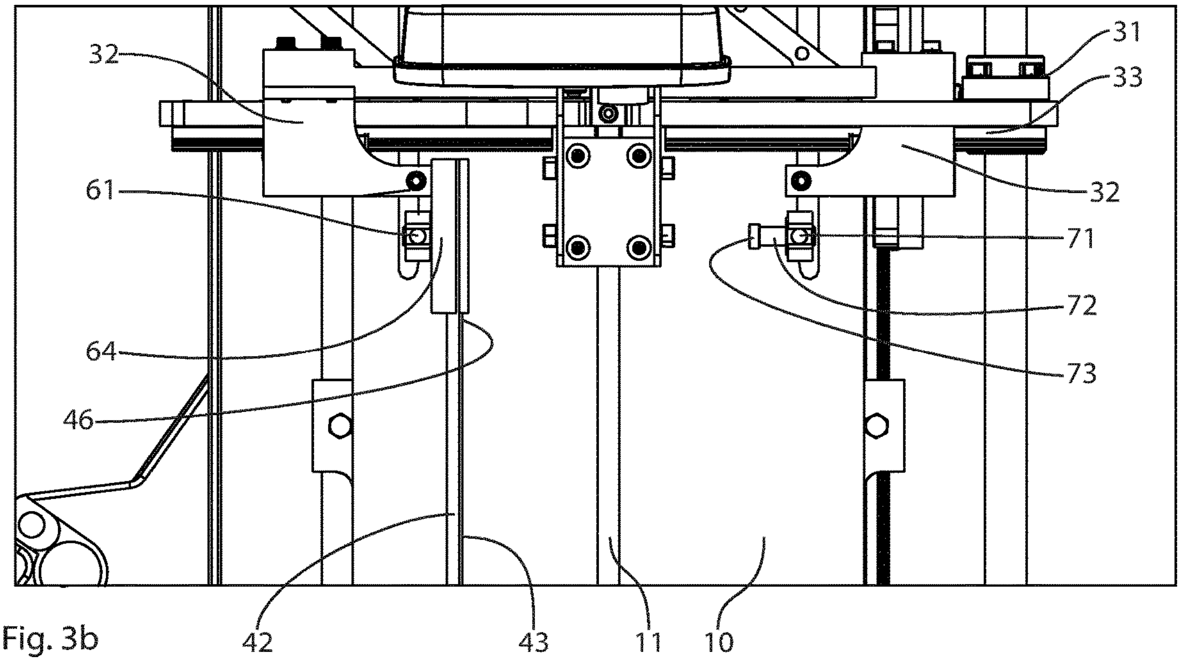

FIGS. 3*a* and 3*b* show detail views of the fastening region of the gripping jaws 40, 50 on the traction means 60, 70 assigned to the gripping jaws (of which the guide housings are omitted in order to better illustrate the internal components of the guide means). The traction means, which can be clearly seen in an oblique view in the following FIGS. 4*a* and 4*b*, are coupled via the guide housings (not shown) to gripping jaw slides 32, which in turn are coupled to a Y-guide 33 of the gripping jaw guide arrangement and ensure a movement of the gripping jaws in the Y direction. The traction means themselves comprise a force arm 61, 71; the movement thereof in the X direction produces a movement of the gripping jaw cords in the X direction and thus a pivoting of the gripping jaws.

In FIG. 3*a*, the gripping jaws are shown in the pivoted state; in FIG. 3*b*, they are shown in the non-pivoted state. Upon a comparison of the force arms 61, 71 in the two figures, it can be seen that, in FIG. 3*a*, they are slightly oblique—that is to say, moved slightly from the Z-axis toward the gripping jaw slides 32; how precisely this movement is initiated is described in reference to FIGS. 4*a* and 4*b*.

It can be seen on the right-hand side of FIG. 3*a* that the circular attachment 73 is arranged eccentrically on the rotary axle 72 of the gripping means assigned to the right gripping jaw on the rotary axle 72. Upon a comparison of FIGS. 3*a* and 3*b*, it can be seen that the attachment in FIG. 3*a* is rotated further onto the gripping jaw slide in the X direction. Since the attachment 73 engages in a circular opening in the second end portion of the gripping jaw cord, a rotation of the rotary axle from the position in FIG. 3*b* (not pivoted) into the position of FIG. 3*a* (pivoted gripping jaws) causes the gripping jaw cord to be moved at its second end portion in the X direction towards the gripping jaw slides, and this movement causes a pivoting of the free end portions 41, 51 of the elastic longitudinal guides toward one another.

FIGS. 4*a* and 4*b* show detailed oblique views of the preferred embodiment in the region of the fastening of the gripping jaws to the traction means 60, 70; in FIG. 4*a*, the non-pivoted state of the gripping jaws is illustrated, and in FIG. 4*b*, the pivoted state of the gripping jaws is illustrated. In order to illustrate in particular the different position of the traction means guide 81 and the force arms 61, 71 of the traction means 60, 70, FIGS. 4*a* and 4*b* are arranged very close to one another, and two vertical dashed lines Z1, Z2 are drawn through both figures.

As can be seen from a comparison of the force arms 61, 71 and the traction means guide 81, the traction means guide 81 is moved further to the "rear" in FIG. 4*b*, away from the storage and retrieval end face of the delivery table. As a result of this movement rearward, the linear movement of the traction means guide 81 is converted into a rotational movement of the rotary axles by the force arms 61, 71 in combination with the rotary axles. Since eccentric attachments 63, 73 are arranged on the rotary axles, the rotational movement of the rotary axle in turn causes a movement of the gripping jaw cords in the X direction.

As was seen in the previous figures, each of the elastic longitudinal guides also comprises a circular opening in the fastening region through which the respective rotary axles of the traction means run. However, since this rotary axle is not formed eccentrically, its rotation does not cause any displacement of the elastic longitudinal guides. As a result of the eccentric attachments, the rotation of the rotary axles thus causes a relative movement of the gripping jaw cords toward the elastic longitudinal guides.

Upon a comparison of the free ends of the force arms 61, 71 "connected" to the vertical line Z2, it can also be seen in the illustration of FIG. 4*b* that they are also moved further backwards.

Figure 5:
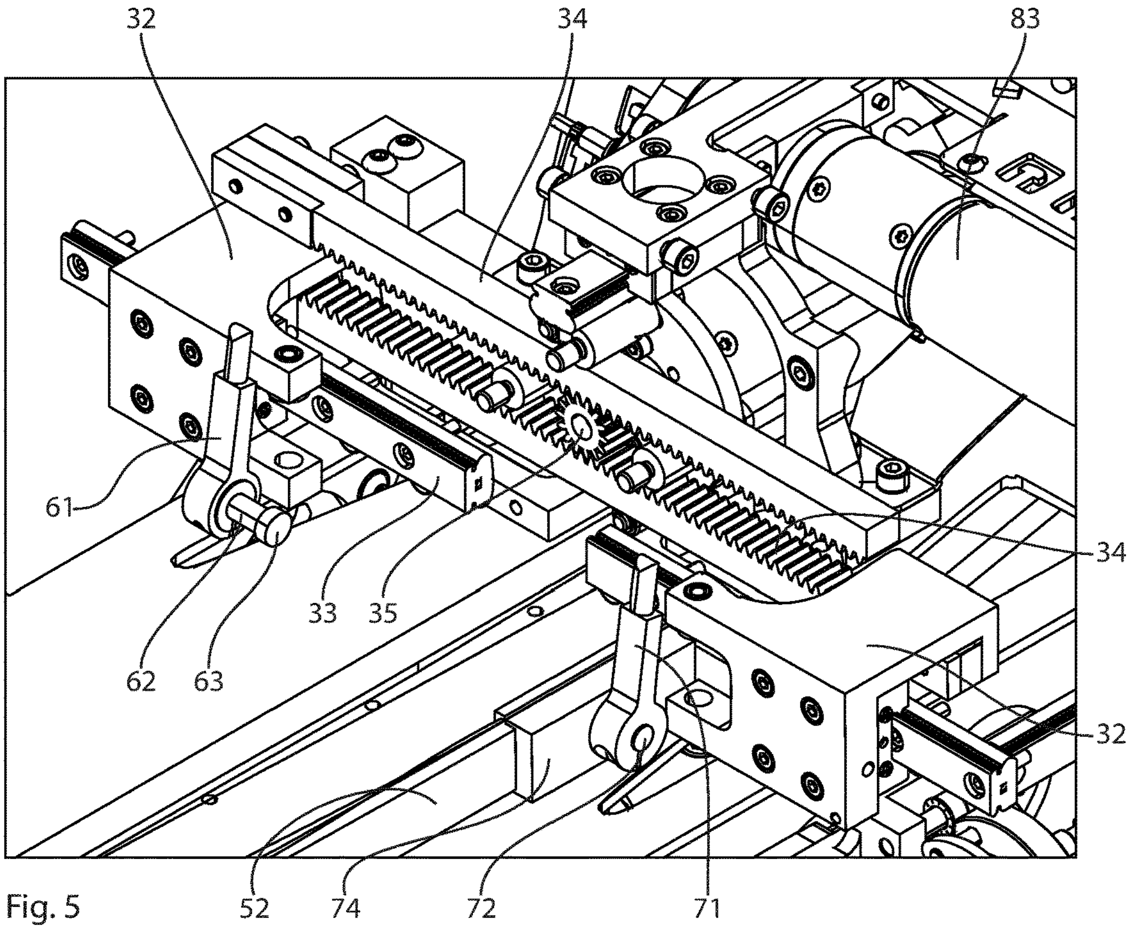
FIG. 5 is a detailed view of the gripping jaw guide arrangement.

FIG. 5 shows a detail view of the gripping jaw guide arrangement, wherein in this figure, inter alia, the traction means guide is omitted in order to illustrate the inner components of the gripping jaw guide arrangement. In the embodiment shown, both gripping jaws are movable in the Y direction. How precisely the mobility of the gripping jaws is achieved in the Y direction is, inter alia, dependent on the specific application area of the gripper; numerous variants are known from the prior art to the person skilled in the art. For example, it is conceivable to provide each gripping jaw with a linear motor which moves the gripping jaw in the Y direction on a corresponding guide. In the embodiment shown, the gripping jaw guide arrangement 30 comprises a two-part Y guide 33, with a gripping jaw slide 32 seated on each part thereof. Each gripping jaw slide is coupled to a guide means 34 designed as a toothed rack, said guide means being arranged such that the tooth surfaces of the two guide means are opposite and overlap within wide ranges. A gearwheel 35 is arranged horizontally and vertically between the guide means 34, and interacts with the tooth surfaces of the guide means in such a way that a rotation of the gearwheel causes a symmetrical movement of the guide means and thus of the gripping jaw slides on the Y-guide. With this embodiment, only one drive is needed for moving the two gripping jaw slides; however, this also causes that the two gripping jaw slides are only movable synchronously.

Figure 6:
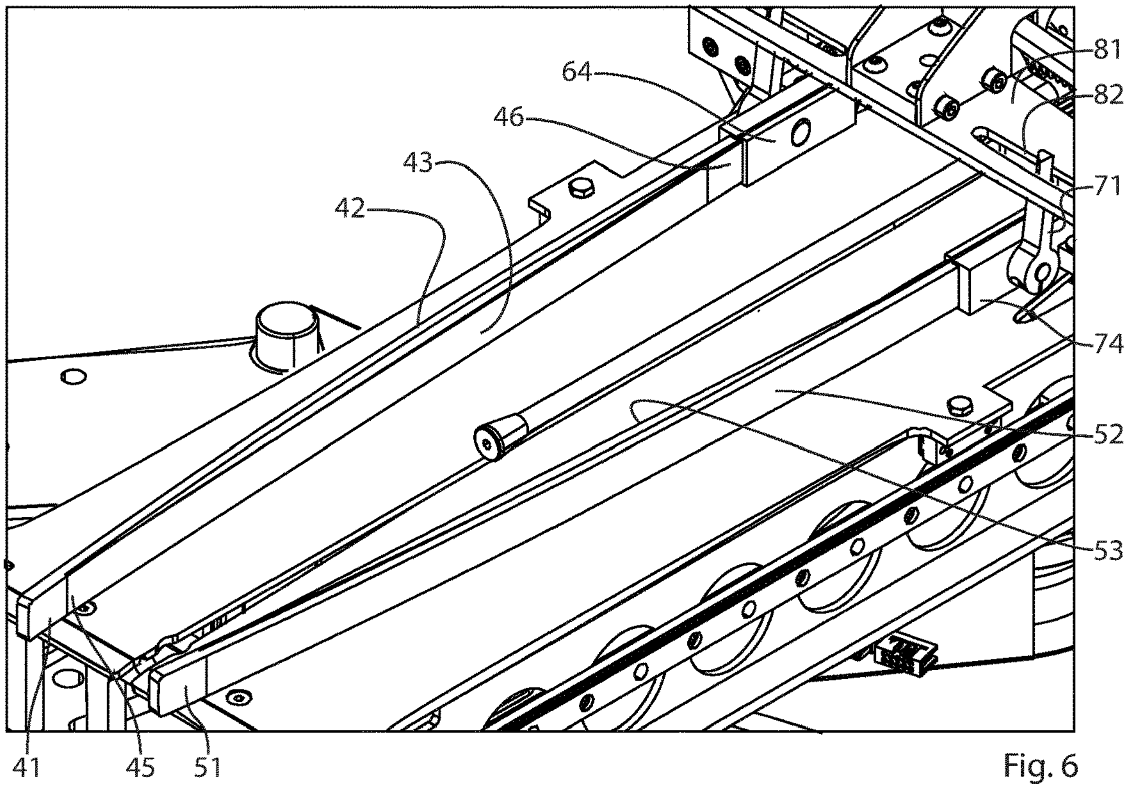
FIG. 6 is a detailed view of the pivoted gripping jaws.

FIG. 6 shows a detailed view of the pivoted gripping jaws. In FIG. 6, it can be seen in particular that the gripping jaw cords are not designed as a type of cable but as an elongate strip—this results in an improved contact with a small piece good being retrieved if the gripping jaws make contact with the small piece good in the region of the gripping jaw cords. Furthermore, it can be seen once again that the gripping jaw cords 43, 53 "separate" during pivoting from the elastic longitudinal guides 42, 52, and thus a space is produced between them.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

The invention claimed is:

1. A gripper for storing and retrieving small piece goods into or from a picking apparatus, comprising:

a delivery table extending in a first horizontal direction and a second horizontal direction orthogonal to the first horizontal direction and having at least one storage and retrieval end face; and a gripping jaw guide arrangement having two elongate gripping jaws arranged above the delivery table, extending in the first direction, the gripping jaw guide arrangement being movable in the first direction, and at least one of the gripping jaws being movable in the second direction, wherein at least one of the gripping jaws has an at least partially elastic longitudinal guide with a free end portion facing away from the gripping jaw guide arrangement, and an opposite fastening end portion, as well as a gripping jaw cord which extends in an untensioned state in parallel along a portion of the elastic longitudinal guide, wherein a first end portion of the gripping jaw cord is fastened to the free end portion of the elastic longitudinal guide, and a second end portion of the gripping jaw cord is coupled to a traction means arranged on the fastening end portion in such a manner that the gripping jaw cord can be moved in the first direction, wherein a movement of the gripping jaw cord in the first direction causes a movement of the free end portion of the elastic longitudinal guide in the second direction.

2. The gripper of claim 1, wherein at least one gripping jaw cord is arranged between an elastic longitudinal guide and an opposite gripping jaw, such that a pulling movement exerted on the gripping jaw cord by the traction means assigned to the gripping jaw cord moves the free end portion of the gripping jaw towards the opposite gripping jaw.

3. The gripper of claim 1, characterized in that wherein the gripper has two traction means and both gripping jaws have an elastic longitudinal guide and a gripping jaw cord, the gripping jaw cords being arranged between the elastic longitudinal guides so that a pulling movement exerted on the gripping jaw cords by the traction means moves the free end portions of the gripping jaws toward each other.

4. The gripper of claim 1, wherein a traction means is designed as a lever device with a force arm and with a rotary axle, the rotary axle having an eccentric circular attachment which engages in an opening at the second end portion of a gripping jaw cord.

5. The gripper of claim 4, wherein each of the free ends of the force arm of the traction means in each case engages in an elongated hole of a traction means actuating device which can be moved in the first direction.

6. A gripper for storing and retrieving small piece goods comprising:

a delivery table;

a gripping jaw guide arrangement comprising two elongate gripping jaws disposed above the delivery table and extending in a first direction of the delivery table; and at least one of the gripping jaws comprising:

an at least partially elastic longitudinal guide with a free end portion facing away from the gripping jaw guide arrangement and an opposite fastening end portion; and a gripping jaw cord configured to extend in an untensioned state in parallel along a portion of the elastic longitudinal guide.

7. The gripper of claim 6, wherein the gripping jaw guide arrangement is configured to be movable in the first direction.

8. The gripper of claim 6, wherein at least one of the gripping jaws is configured to be movable in a second direction.

9. The gripper of claim 6, wherein a first end portion of the gripping jaw cord is fastened to the free end portion of the elastic longitudinal guide.

10. The gripper of claim 9, wherein a second end portion of the gripping jaw cord is coupled to a traction device disposed on the fastening end portion.

11. The gripper of claim 10, wherein the traction device is configured so that the gripping jaw cord can be moved in the first direction.

12. The gripper of claim 11, wherein movement of the gripping jaw cord in the first direction is configured to cause a movement of the free end portion of the elastic longitudinal guide in the second direction.

13. The gripper of claim 10, wherein at least one gripping jaw cord is disposed between an elastic longitudinal guide and an opposite gripping jaw.

14. The gripper of claim 13, wherein a pulling movement exerted on the gripping jaw cord by the traction device is configured to move the free end portion of the gripping jaw towards the opposite gripping jaw.

15. The gripper of claim 6, further comprising:

two traction devices, wherein each gripping jaw comprises:

an elastic longitudinal guide; and a gripping jaw cord.

16. The gripper of claim 15, wherein each traction device is configured to pull one of the gripping jaw cords to pull an attached gripping jaw towards the other gripping jaw.

17. The gripper of claim 10, wherein the traction device comprises:

a lever having a force arm; and a rotary axle.

18. The gripper of claim 17, wherein the rotary axle comprises an eccentric circular attachment configured to engage in an opening at a second end portion of the gripping jaw cord.

19. The gripper of claim 17, further comprising:

a traction actuating device.

20. The gripper of claim 19, wherein a portion of the force arm is disposed within an elongated hole of the traction actuating device and the force arm is moveable in the first direction.

* * * * *